Dec. 2, 1930.                    W. E. LAHEY                    1,783,509
                                  PIPE CLAMP
                               Filed June 3, 1927

Inventor
William E. Lahey
By
Towson Price
Attorney

Patented Dec. 2, 1930

1,783,509

UNITED STATES PATENT OFFICE

WILLIAM EDWARD LAHEY, OF LIMA, OHIO

PIPE CLAMP

Application filed June 3, 1927. Serial No. 196,243.

This invention relates to clamps, and, more particularly, to such adapted to encircle pipes for stopping leaks therein.

The principal object of my invention, generally considered, is to provide a pipe clamp particularly adapted to stop leaks in pipe lines carrying any commodity, whether gas or liquid regardless of pressure or temperature, quickly and permanently.

An object of my invention is the provision of a pipe clamp which is light in weight, positive in action, and adapted for quick and easy installation regardless of the location or size of the hole or holes or the length of the split in the pipe to be stopped.

Another object of my invention is to provide a clamp for stopping leaks in pipes in which tightening thereof is effected by merely turning the nuts or threadably engaged members thereof, said clamp being so designed that said nuts are always accessible regardless of the location of the leak.

A further object of my invention is the provision of a clamp composed of relatively few and simple parts and preferably involving a pair of blocks or corner castings with outstanding ears, a U-bolt being connected to the outermost of said ears and embracing the associated pipe while another bolt, preferably straight, engages the innermost ears thereof, a shoe plate and gasket being applied either beneath a portion of the U-bolt or one of the corner castings depending on the location of the leak in the pipe, whereby the nuts may always be disposed upwardly and thereby rendered accessible even though the pipe may be partly buried.

Other objects and advantages of the invention relating to the particular arrangement and construction of the various parts will become apparent as the description proceeds.

Referring to the drawings illustrating my invention, the scope whereof is defined by the appended claims:

Figures 1, 2, 3:
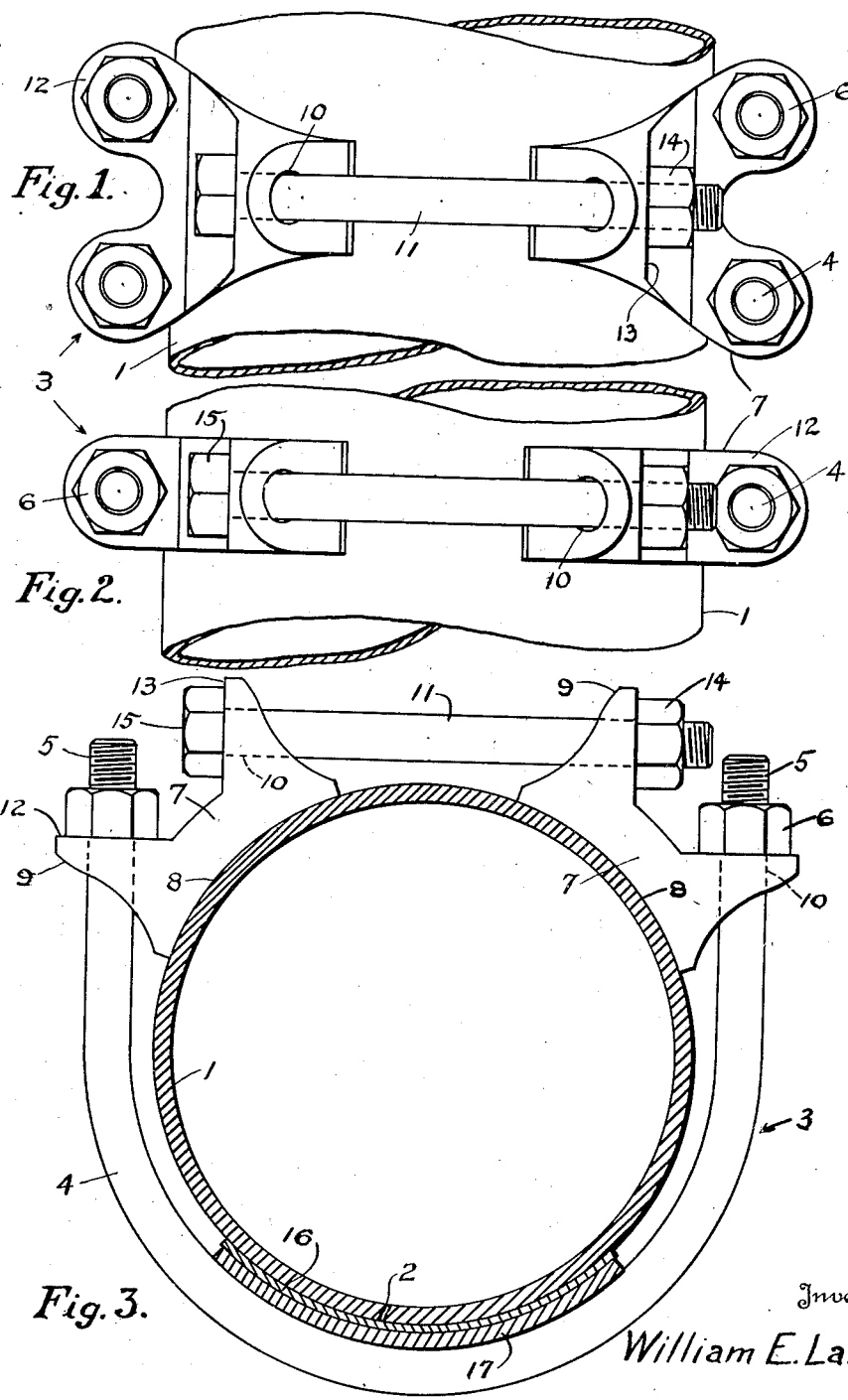
Figure 1 is a plan of a section of pipe with a clamp of the double variety embodying my invention, that is, involving two U-bolts, applied thereto.
Figure 2 is a similar plan illustrating a clamp of the single variety, that is, involving only one U-bolt.
Figure 3 is an elevational view of a clamp such as shown in either of the preceding figures, the pipe to which it is applied, gasket and shoe plate associated therewith being illustrated in transverse section.

Referring to the drawings in detail, like parts being designated by like reference characters, 1 designates a pipe adapted to carry any commodity either in gaseous or liquid form, said pipe being illustrated as having a leak or crack 2 therein. A clamp, generally designated by the reference character 3, is illustrated and said clamp may involve one or more U-members or bolts 4 adapted to embrace or partially encircle said pipe, as illustrated particularly in Figure 3. In Figure 1, the clamp is shown as involving two U-bolts or rods 4 and in Figure 2, is shown as involving only one of said bolts. However, I do not wish to be limited to this showing as the number of U-bolts employed depends on the character and extent of the leak or split which is to be stopped by my clamp.

The ends of the U-bolt or bolts 4 are preferably threaded as indicated at 5 for receiving nuts 6 thereon. Associated with the ends of said bolt or bolts are corner castings or blocks 7 preferably provided with concave inner surfaces 8 adapted to engage the associated pipe 1 and outstanding ears 9 apertured as indicated at 10 for receiving the ends of the U-bolt 4 and an associated cross or connecting bolt 11. The ends of the U-bolt or bolts preferably extend through the apertured ears which are farthest from the vertical center line of the pipe, that is, those which, in the embodiment illustrated, extend away from each other and are substantially horizontal. The cross bolt or rod 11 preferably extends through those ears which are nearest together and to the vertical center line of the pipe, and which extend substantially vertical in the embodiment illustrated. The ears 9 engaged by a U-bolt are preferably formed with upper flat approximately horizontal surfaces 12 adapted for engagement with the corresponding face of the associated nut 6. In a similar manner, the ears 9, engaged by the cross bolt, are provided with approximately vertical faces 13 adapted for engagement with either the associated nut 14 on the bolt 11 or the head 15 thereof. From the foregoing, it will be seen that the axis of the rod means 11 normally lies in the axial plane of the U-shaped means 4. Although the bolt is illustrated as provided with a head at one end and a nut threadably engaged thereon at the other end, I do not wish to be limited to this showing as it is obvious that said bolt may be threaded for the reception of a nut at each end. It will be apparent that, in the embodiment illustrated, the faces 12 and 13 are disposed at approximately right angles with respect to each other, however, I do not wish to be limited to this showing.

For stopping the leak, split or crack 2 in the pipe, a gasket 16 of any suitable material, such as rubber, felt, fiber or the like may be employed and, between said gasket and the clamp 3, a shoe plate 17 is provided. When the leak is at or near the bottom of the pipe as illustrated, said gasket and shoe plate are applied between the U-bolt or bolts and the pipe, whereas, if said leak is at a different location, the position of said gasket and shoe plate is changed to correspond, said clamp being adapted for slight rotative movement one way or the other so that the casting utilized may be arranged substantially central with respect to the leak, said clamp, however, being preferably maintained so that the nuts 6 and 14 are substantially uppermost, whereby they are accessible for any desired manipulation thereof.

A preferred manner of applying the clamp to a pipe is as follows. The U-bolt or bolts are placed around the pipe, the corner castings or blocks slipped in place thereover in substantially the position illustrated in Figure 3, the nuts applied to the threaded ends 5 of said bolts, after which the bolt 11 is inserted through the remaining perforated ears 9 of the castings and its nut 14 applied thereon. The shoe plate with a suitable gasket is then placed over the leak or hole and the assembled clamp positioned so that the gasket presses substantially centrally over the leak. The nuts are then tightened until the leak is stopped. It will be understood that, if the leak is in or near the top of the pipe, the shoe plate and gasket, instead of being placed under the U-bolt or bolts, may be placed under one or both of the corner castings 7, whereby the nuts may always be positioned substanially uppermost, making them readily accessible regardless of the location of the leak.

From the foregoing description taken in connection with the accompanying drawings, it will be apparent that I have devised a clamp which is light in weight, positive in action, adapted to be cheaply manufactured and readily applied to pipes of any size for quickly and permanently stopping leaks therein. Although preferred embodiments of my invention have been described in detail, it will be obvious that I do not wish to be limited to the exact showing but desire to cover all embodiments which are embraced within the spirit and scope of my invention or covered by the following claims.

Having now described my invention, I claim:

1. A clamp comprising a U-shaped member adapted to embrace a pipe and hold leak-stopping means thereagainst, blocks with perforated ears receiving the ends of said member, a connecting bolt extending in the plane of the U-shaped member through other perforated ears on said blocks, the ends of said bolt and member being threadably engaged by nuts for tightly pressing the leak-stopping means against said pipe.

2. A clamp comprising a plurality of castings with concave faces adapted to engage a pipe and innermost and outermost outstanding ears perforated for receiving bolts and provided with faces adapted to be engaged by nuts threaded on said bolts, a curved bolt adapted to embrace said pipe and extend through the apertures in the outermost ears of said castings and be connected thereto by means of nuts threaded thereon, and a straight bolt extending through the apertures in the innermost ears, lying in the plane of the curved bolt, and connected thereto by a head and nut, respectively, on said bolt.

3. A clamp comprising a U-bolt adapted to embrace a pipe and hold leak stopping means thereagainst, blocks with outstanding perforated ears some of which engage the ends of said bolt, nuts threaded on the ends of said bolt and engaging said blocks for connecting the same to said bolt, and a cross bolt extending through the perforations in the remaining ears on said blocks lying in the plane of the U-bolt, and connecting said blocks together by means of a nut threadably engaging the end thereof.

4. A clamp comprising a U-bolt adapted to embrace a pipe, a cross bolt, and castings with circumferentially aligned outstanding perforated ears receiving the respective ends of said bolts for connecting them together in the same plane.

5. A clamp, adapted to embrace a pipe and hold a shoe plate and associated gasket thereagainst, comprising a U-shaped member, corner blocks with outstanding perforated ears extending in a common plane and receiving the ends of said member, other ears on said blocks disposed approximately at right angles to the first mentioned ears, a connecting member extending through said other ears and connecting said blocks by a threadably engaged nut thereon, the ends of said U-shaped member being likewise connected to said corner blocks, for tightly pressing said shoe plate and gasket against said pipe.

6. A clamp comprising a U-bolt and a straight bolt adapted to be circumferentially alined, connected end to end around a pipe by nuts threaded on the ends thereof and engaging associated connecting means, and a gasket device adapted for insertion between a desired part of the clamp and pipe for stopping a leak in said pipe, whereby said clamp may be always positioned with the ends of the U-bolt pointing upward.

7. In combination, a pipe and a clamp encircling said pipe comprising a U-bolt embracing the same, a straight cross bolt, and means connecting the adjacent ends of said bolts comprising blocks with perforated ears extending approximately at right angles to each other.

8. In combination, a pipe and a clamp encircling said pipe comprising a U-shaped member, blocks with circumferentially aligned perforated ears receiving the ends of said member, a connecting bolt extending in the plane of the U-shaped member through other perforated ears on said blocks, the ends of said bolt and member being threadably engaged by nuts so that the clamp is adapted to press leak stopping means tightly against said pipe.

9. In combination, a pipe and clamp therearound comprising a U-bolt embracing said pipe, blocks with outstanding ears disposed at approximately right angles to one another, some of which engage the ends of said bolt, nuts threaded on the ends of said bolt and engaging said blocks for connecting the same to said bolt, a cross bolt extending through the perforations in the remaining ears on said blocks and connecting said blocks together by means of a nut threadably engaging the ends thereof, and gasket means adapted to be disposed between said clamp and the pipe for stopping a leak in said pipe.

10. In combination, a pipe and clamp embracing the same and adapted to hold a shoe plate and associated gasket thereagainst, said clamp comprising a U-shaped member with the ends thereof parallel to each other, corner blocks with outstanding perforated ears disposed in the same plane and receiving the ends of said member, other ears on said blocks, a connecting member extending through the other ears and connecting said blocks by a threadably engaging nut thereon, the ends of said U-shaped member being likewise connected to said block and adapted to tightly press said plate and gasket against said pipe.

11. A clamp comprising U-shaped means adapted to embrace a pipe, straight cross bolt means lying in the axial plane of the U-shaped means, and blocks perforated for receiving the ends of said U-shaped means and said straight bolt means for connecting the adjacent ends thereof, said blocks providing abutments for nuts on the ends of said connected means.

12. A clamp comprising U-shaped means adapted to embrace a pipe, straight rod means with an axis normally lying in the axial plane of said U-shaped means, and means connected with the adjacent ends of said rod and U-shaped means for transmitting force therebetween.

13. A pipe patch comprising a clamp having a pair of substantially straight side portions and a curved mid-portion, substantially straight cross bolt means connecting the extremities of the side portions and so disposed that the line of the force transmitted thereby lies substantially in the axial plane of the clamp, said side portions being of a length sufficient to space the cross means from the curved mid-portion a distance substantially corresponding with the space between the straight portions of the clamp, blocks disposed inwardly of the joint between the clamp and cross member and arranged to be forced against the surface of the enclosed pipe substantially radially of the same, substantially as set forth.

14. A clamp comprising a U-shaped bolt adapted to embrace a pipe, cooperating straight bolt means so disposed that the effective axis of said means lies substantially in the axial plane of said U-shaped bolt, and means apertured for receiving the adjacent ends of said U-shaped bolt and straight bolt means to provide for the transmission of force therebetween.

In testimony whereof I affix my signature.
WILLIAM EDWARD LAHEY.